2,905,972

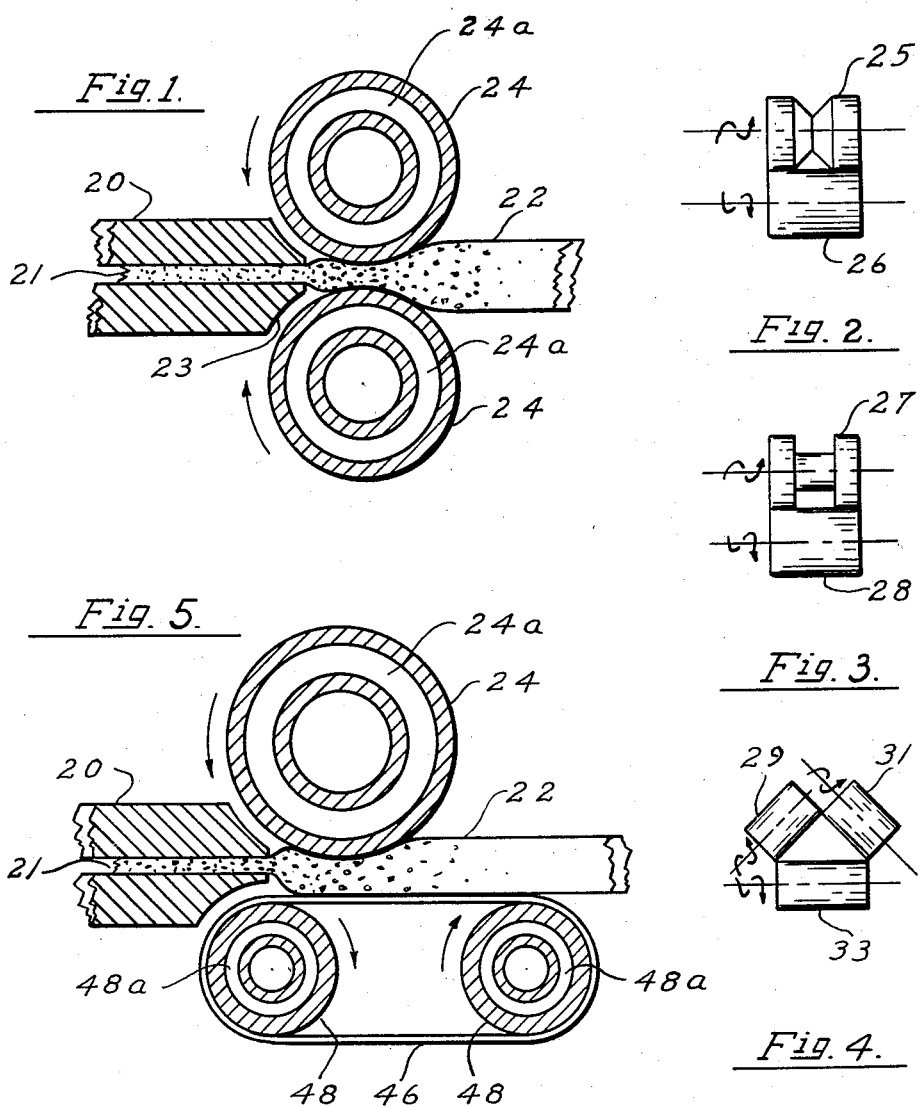

METHOD FOR PREPARING FOAMED THERMOPLASTIC RESIN FORMS

Ardashus A. Aykanian, Indian Orchard, and Frank A. Carlson, Jr., Springfield, Mass., assignors to Monsanto Chemical Company, St. Louis, Mo., a corporation of Delaware Application December 27, 1957, Serial No. 705,633

6 Claims. (Cl. 18—48)

This invention relates to methods for preparing foamed thermoplastic resin forms having smooth, wrinkle-free profile surfaces and is a continuation-in-part of our copending application S.N. 538,837, filed October 6, 1955, and now abandoned.

Foamed thermoplastic resins such as foamed polystyrene are low-density materials having high strength/weight ratios and excellent insulating properties. The methods heretofore employed in preparing foamed thermoplastic resin forms have been costly and inefficient. In general, the foamed thermoplastic resin forms have been cut to the desired shape from a large block or cylinder of foamed resin. This manufacturing technique has been dictated by the inability of the art to prepare foamed thermoplastic resin forms having smooth, wrinkle-free profile surfaces except by foaming the thermoplastic resin batchwise in closed dies. Attempts to prepare foamed thermoplastic resin forms directly by extrusion means have been unsuccessful, since when foamable thermoplastic resin compositions are extruded into air above their foaming temperatures, they foam into wrinkled, corrugated structures.

Accordingly, it is an object of this invention to provide methods for preparing foamed thermoplastic resin forms having smooth, wrinkle-free profile surfaces.

This and other objects and advantages of the invention will become apparent from the following description thereof when read in conjunction with the attached drawings in which Fig. 1 is a schematic side view of one embodiment of the invention in which a foamed thermoplastic resin is extruded in the form of a sheet, Figs. 2, 3, and 4 are diagrammatic end views of forming means that may be substituted for the rolls illustrated in Fig. 1, and Fig. 5 is a modification of the embodiment illustrated in Fig. 1.

A method for preparing foamed thermoplastic resin forms having smooth, wrinkle-free profile surfaces has been discovered. In this method the foamable thermoplastic resin composition is extruded directly into a cooled forming die adapted to apply pressure on the profile of the extruded form, said forming die being defined by a plurality of surfaces which are driven in the direction of extrusion. When the foamed thermoplastic resin is to be fabricated into a sheet, the forming die may be a pair of driven cooling rolls. The distance between the extruder die orifice and the forming die is kept as short as possible so that the extruded foamed thermoplastic resin contacts the forming die before it has foamed into a wrinkled, corrugated mass. Stated positively, the distance between the extruder die orifice and the forming die is sufficiently short so that when the extruded foamed thermoplastic resin contacts the forming die its profile is substantially a uniform expansion of the profile of the extruder die orifice. This method is especially adapted to the production of foamed thermoplastic resin sheets.

In the embodiment illustrated in Fig. 1, a foamable thermoplastic resin composition, e.g. polystyrene containing 5–8% pentane, is delivered by an extruder (not shown) into an extruder die 20 in a fluid state above its melting point, but foaming within the extruder and extruder die is suppressed by maintaining the plastic mass under pressure. When the plastic mass is extruded in sheet form through orifice 23 of channel 21, the sudden pressure drop (extruder pressure to atmospheric pressure) causes rapid foaming of sheet 22. Orifice 23 is positioned very close to the nip of rolls 24—24 and as a result sheet 22 contacts the rolls before it has foamed itself into a corrugated sheet. In passing through the nip of the rolls, the surfaces of the sheet are cooled and the expansion of the resin forces the surfaces of sheet into pressured engagement with rolls 24—24 thereby providing smooth, wrinkle-free surfaces on the sheet. After leaving rolls 24—24, sheet 22 will continue to expand because of the heat retained within its center, but since the surfaces of the sheet have been cooled to the solid state, any further expansion will be slow and uniform so as to produce substantially no wrinkles in the surface of the sheet. The foam contacting surfaces of rolls 24—24 are cooled by circulating cooling water through the liquid chambers 24a—24a provided therein.

The invention is not limited to the preparation of wrinkle-free sheets, but is equally well adapted to the preparation of foamed thermoplastic resin forms having diverse physical shapes. Fig. 2 is an end view of a forming die in which a triangular groove is cut in roll 25 and roll 26 is flat. The foamed thermoplastic resin is obtained from this die in the form of a triangular rod. Fig. 3 is a modification of Fig. 2 in which a square groove is cut in roll 27 and roll 28 is flat. The foamed thermoplastic resin is obtained from this die in the form of a bar. Fig. 4 is an end view of a forming die consisting of 3 rolls, 29, 31 and 33 which shape the foamed thermoplastic resin into a triangular rod. In the preparation of such irregularly shaped structures it is desirable to have the extruder die orifice cut to approximately the geometric shape of the cross-sectional profile of the final extruded form.

Fig. 5 illustrates a modification of the embodiment of Fig. 1 in which sheet 22 is extruded onto a short endless belt 46 which is driven by rolls 48—48 in cooperative relationship with cooled roll 24. The surface of roll 24 is cooled by circulating cooling water through liquid chamber 24a provided therein and belt 46 is cooled by circulating cooling water through the liquid chambers 48a—48a provided in rolls 48—48. In all other respects this embodiment is identical with the one illustrated in Fig. 1.

The following examples are set forth to illustrate more clearly the principle and practice of this invention to those skilled in the art.

Example 1

A flat sheet of foamed polystyrene was prepared employing the apparatus illustrated in Fig. 1. The orifice 23 of extruder die 20 measured 8" x 0.040". The rolls 24—24 were 16" long and 4" in diameter and their surfaces were chrome plated. The clearance between rolls 24—24 was 0.075" and the distance between the face of the extruder die orifice and the nip of rolls 24—24 was 0.25". A styrene homopolymer of 60,000 molecular weight which contained 6.6 weight percent of pentane as a foaming agent was extruded through die 20 at a temperature of 295° F. and at a rate of 42 pounds per hour. The rolls 24—24 were rotated at a speed of 9.5 revolutions per minute and their surface temperatures were maintained at 115° F. by circulating water through chambers 24a—24a. The foamed polystyrene sheet was delivered from rolls 24—24 at a rate of 8 ft. per minute. The finished sheet was 12" wide, 0.25" thick and had a density of about 5.5 lbs./cu. ft.

*Example II*

Example I was repeated except that the following changes were made in the apparatus: (1) the die orifice 23 was increased to 8" x 0.080", (2) the clearance between rolls 24—24 was increased to 0.150", and (3) the speed of rolls 24—24 was decreased to 5 revolutions per minute. When operating under these conditions, the foamed polystyrene sheet was delivered from rolls 24—24 at a rate of 4 ft. per minute. The finished sheet was 12" wide, 0.50" thick and had a density of about 5.2 lbs./cu. ft.

*Example III*

Example I was repeated except that the following changes were made in the apparatus: (1) the die orifice 23 was decreased to 8" x 0.018", (2) the clearance between rolls 24—24 was decreased to 0.035", (3) the speed of rolls 24—24 was increased to 25 revolutions per minute and (4) the distance between the face of the extruder die orifice and the nip of rolls 24—24 was decreased to 0.150". The foamed polystyrene sheet was delivered from rolls 24—24 at a rate of 20 ft. per minute. The finished sheet was 12" wide, 0.10" thick and had a density of about 4.8 lbs./cu. ft.

A critical feature of the present invention is the distance set between the extruder die orifice and the forming die. This distance must be sufficiently short so that the extruded thermoplastic resin form contacts the forming die before it has been foamed into a wrinkled corrugated mass. Stated positively, the distance must be sufficiently short so that when the extruded thermoplastic resin form contacts the forming die, its profile is substantially a uniform expansion of the profile of the extruder die orifice. By operating in this manner the forming die cools the surface of the extruded form while foaming within the interior of the extruded form forces the surfaces thereof into pressured contact with the forming die so as to form smooth, substantially wrinkle-free surfaces. While the extruded form may continue to foam after leaving the forming die (because of the heat retained within the center of the extruded form), any such further foaming will be slow and uniform and will produce substantially no wrinkles in the profile surfaces of the extruded form.

The precise distance within which the extruder die orifice and the forming die must be set is influenced by such a multiplicity of factors that it is not possible to state the distance with mathematical preciseness unless all the parameters of the extrusion system are first specified. To indicate the order of magnitude to be employed, however, it may be noted that in preparing a 0.25-inch thick sheet by extruding the foamable resin into the nip of a pair of cooling rolls of 4-inch diameter, the extruder die orifice should be set within about 1 inch of the nip of the rolls and optimum results are obtained when the extruder die orifice is set within less than about 0.5 inch of the nip of the rolls.

One of the principal factors which influences the distance within which the extruder die orifice and the forming die must be set, is the temperature employed in extruding the foamable thermoplastic resin composition. As the extrusion temperature is increased, the rate of foaming is accelerated and the characteristic wrinkling of the extruded forms occurs closer to the extruder die orifice. Consequently, as the extrusion temperature is increased, the extruder die orifice must be moved closer to the forming die. For this reason, it is desirable to operate the extruder at the lowest feasible temperature at which the foamable thermoplastic resin composition can be extruded to give a foam of the desired density.

Another factor affecting the distance within which the extruder die orifice and the forming die must be set is the nature of the foamable thermoplastic resin composition employed. For example, when a composition is extruded at a fixed temperature, the degree and rapidity of foaming is a function of the concentration of the foaming agent incorporated within the extruded composition. Consequently, as the quantity of foaming agent included in the extruded composition is increased, the distance between the extruder die orifice and the forming die must be shortened. Since to a degree, at least, the minimum extrusion temperature that can be employed is a function of the viscosity of the thermoplastic resin being extruded, lowering the molecular weight of the thermoplastic resin (which will lower its viscosity) will have the effect of lowering the minimum extrusion temperature that can be employed. By making possible a lower extrusion temperature, lowering of the molecular weight of the thermoplastic resin in turn will permit a greater latitude in setting the distance between the extruder die orifice and the forming die.

Another critical feature of this invention is that the surfaces of the forming die must be cooled to a temperature substantially below the temperature of the extruded thermoplastic resin composition. The maximum cooling surface temperature that can be employed is influenced by a multitude of factors such as the nature of the foamable thermosplastic resin composition being extruded, the rate at which the thermoplastic resin composition is being extruded into the forming die, the heat transfer characteristics of the cooling surfaces, etc. Consequently, it is not possible to state precisely the maximum operable cooling surface temperature that can be employed until the other parameters of the system are fixed. Good results are nearly always obtained when the cooling surface temperature does not exceed 50° C.

The foamable thermoplastic resin compositions employed in this invention consist of a thermoplastic resin and a suitable foaming or pore-forming agent. Examples of thermoplastic resins that may be employed include cellulose ethers and esters, e.g., ethyl cellulose, cellulose acetate; homopolymers and interpolymers of monomeric compounds containing the $CH_2=C<$ grouping such as olefins, e.g., ethylene, isobutylene; vinyl halides, e.g., vinyl chloride; vinylidene chloride; vinyl esters of carboxylic acids, e.g., vinyl acetate, vinyl propionate, vinyl butyrate, vinyl benzoate; vinyl ethers, e.g., vinyl methyl ether, vinyl ethyl ether, vinyl isobutyl ether; unsaturated carboxylic acids and derivatives thereof, e.g., acrylic acid, methacrylic acid, methyl acrylate, ethyl acrylate, methyl methacrylate, acrylamide, acrylonitrile, methacrylonitrile, and interpolymers of the above mentioned vinylidene monomers with unsaturated alpha,beta-polycarboxylic acids and derivatives thereof, e.g., maleic anhydride, diethyl maleate, dibutyl fumarate, diallylmaleate, dipropyl maleate, etc. In general, optimum results are obtained with rigid, relatively nonelastic thermoplastic resins such as homopolymers and interpolymers of vinyl chloride, homopolymers of vinylidene aromatic compounds, e.g., styrene, o-chlorostyrene, p-chlorostyrene, 2,5-dichlorostyrene, 2,4-dichlorostyrene, p-methylstyrene, p-ethylstyrene, vinyl naphthalene, alpha-methylstyrene, and interpolymers of such vinyl aromatic compounds containing at least 70% of the vinyl aromatic compound. It is feasible and sometimes desirable to employ a blend of two or more thermoplastic resins such as a blend of styrene and a rubbery polymer such as natural rubber, butadiene-acrylonitrile rubbers, and the like. High impact polystyrene prepared by polymerizing monomeric styrene in the presence of a rubbery diene polymer may also be employed advantageously.

Suitable foaming agents for the thermoplastic resins are well known and the selection of the particular foaming agent to be employed will be dictated largely by the particular thermoplastic resin in which it is to be incorporated. It is preferred to employ as foaming agents nonreactive organic liquids which have not more than a slight solvent action on the thermoplastic resin and which volatilize below the softening point of the thermoplastic resin.

Examples of suitable foaming agents that may be employed with polystyrene include pentane, hexane, heptane, petroleum ether, cyclopentane, cyclopentadiene, acetone, methanol, methyl acetate, ethyl acetate, methyl formate, ethyl formate, dichloroethylene, isopropyl chloride, propionaldehyde, and diisopropyl ether. Usually the foaming agent will be employed in the amount of about 5–10 weight percent of the thermoplastic resin.

Coloring agents, pigments, light and heat stabilizers, lubricants and other conventional plastic compounding agents may be included in the foamable thermoplastic resin compositions.

The above description and particularly the examples are set forth by way of illustration only. It will be obvious to those skilled in the art that many variations and modifications thereof can be made without departing from the spirit and scope of the invention herein described.

What is claimed is:

1. A method for preparing continuous foamed thermoplastic resin forms having smooth, substantially wrinkle-free profile surfaces which comprises extruding a foamable thermoplastic resin composition through an orifice into a forming die at a temperature sufficiently high to expand the extruded form beyond the profile limits of the forming die and cooling the resin contacting surfaces of the forming die to a temperature substantially below the temperature of the extruded thermoplastic resin composition; said forming die consisting of a plurality of surfaces which are driven in the direction of extrusion and being downstream from and in immediate proximity to said orifice, the distance between the face of the orifice and the resin contacting surfaces of the forming die being less than about 1 inch and sufficiently short so that when the extruded thermoplastic resin form contacts the forming die its profile is substantially a uniform expansion of the profile of the extruder die orifice; said foamable thermoplastic resin composition comprising a thermoplastic resin and, as a foaming agent, a nonreactive organic liquid which has not more than a slight solvent action on the thermoplastic resin and which boils below the softening point of the thermoplastic resin.

2. A method for preparing a smooth, substantially wrinkle-free continuous sheet of foamed thermoplastic resin which comprises extruding a sheet of foamable thermoplastic resin composition through an orifice into a forming die at a temperature sufficiently high to expand the extruded sheet beyond the profile limits of the forming die and cooling the resin contacting surfaces of the forming die to a temperature substantially below the temperature of the extruded thermoplastic resin composition; said forming die consisting of a pair of parallel surfaces which are driven in the direction of extrusion and being downstream from and in immediate proximity to said orifice, the distance between the face of the orifice and the resin contacting surfaces of the forming die being less than about 1 inch and sufficiently short so that when the extruded thermoplastic resin sheet contacts the forming die its profile is substantially a uniform expansion of the profile of the extruded die orifice; said foamable thermoplastic resin composition comprising a thermoplastic resin and, as a foaming agent, a non-reactive organic liquid which has not more than a slight solvent action on the thermoplastic resin and which boils below the softening point of the thermoplastic resin.

3. A method for preparing a smooth, substantially wrinkle-free continuous sheet of foamed thermoplastic resin which comprises extruding a sheet of foamable thermoplastic resin composition into the nip of a pair of oppositely rotating rolls at a temperature sufficiently high to expand the foamable thermoplastic resin composition beyond the nip of the rolls and cooling the resin contacting surfaces of the rolls to a temperature substantially below the temperature of the extruded thermoplastic resin composition; said rolls being driven in the direction of extrusion and being downstream from and in immediate proximity to the orifice; the distance between the face of the extruder die orifice and the nip of the cooling rolls being (a) less than about 1 inch, (b) less than the radius of the cooling rolls and (c) sufficiently short so that when the extruded thermoplastic resin sheet contacts the cooling rolls its profile is substantially a uniform expansion of the extruder die orifice; said foamable thermoplastic resin composition comprising a thermoplastic resin and, as a foaming agent, a non-reactive organic liquid which has not more than a slight solvent action on the thermoplastic resin and which boils below the softening point of the thermoplastic resin.

4. The method of claim 1 in which the foamable thermoplastic resin composition extruded into the forming die comprises a styrene polymer containing at least 70 weight percent styrene in its structure and a liquid aliphatic hydrocarbon which volatilizes below the softening point of the styrene polymer.

5. The method of claim 2 in which the foamable thermoplastic resin composition extruded into the forming die comprises a styrene polymer containing at least 70 weight percent styrene in its structure and a liquid aliphatic hydrocarbon which volatilizes below the softening point of the styrene polymer.

6. The method of claim 3 in which the foamable thermoplastic resin composition extruded into the nip of the pair of oppositely rotating rolls comprises a styrene polymer containing at least 70 weight percent styrene in its structure and a liquid aliphatic hydrocarbon which volatilizes below the softening point of the styrene polymer.

References Cited in the file of this patent

UNITED STATES PATENTS

| 2,624,913 | Montrass et al. | Jan. 13, 1953 |
| 2,740,157 | McCurdy et al. | Apr. 3, 1956 |
| 2,774,991 | McCurdy et al. | Dec. 25, 1956 |

FOREIGN PATENTS

| 472,796 | Italy | June 30, 1952 |